United States Patent
Kim et al.

(10) Patent No.: US 8,140,020 B2
(45) Date of Patent: Mar. 20, 2012

(54) RADIO FREQUENCY CALIBRATION APPARATUS AND METHOD FOR MULTI-ANTENNA MOBILE COMMUNICATION SYSTEM

(75) Inventors: Joon-Hyung Kim, Daejon (KR); Jae-Ho Jung, Daejon (KR); Heon-Kook Kwon, Daejon (KR); Kwang-Chun Lee, Daejon (KR)

(73) Assignees: Electronics and Telecommunications Research Institute, Daejon (KR); Samsung Electronics Co., Ltd., Suwon-Si, Gyeonggi-Do (KR)

( * ) Notice: Subject to any disclaimer, the term of this patent is extended or adjusted under 35 U.S.C. 154(b) by 307 days.

(21) Appl. No.: 12/443,689

(22) PCT Filed: Sep. 21, 2007

(86) PCT No.: PCT/KR2007/004690
§ 371 (c)(1),
(2), (4) Date: Nov. 11, 2009

(87) PCT Pub. No.: WO2008/038988
PCT Pub. Date: Apr. 3, 2008

(65) Prior Publication Data
US 2010/0056083 A1    Mar. 4, 2010

(30) Foreign Application Priority Data

Sep. 29, 2006  (KR) .................. 10-2006-0095877

(51) Int. Cl.
*H04B 17/00* (2006.01)

(52) U.S. Cl. ............... 455/67.11; 455/226.1; 455/115.1; 455/234.1

(58) Field of Classification Search .............. 455/91, 455/67.11–67.16, 226.1–226.4, 115.1–115.4, 455/101, 272, 73, 78, 83, 553.1, 232.1–253.1, 455/127.1–127.5; 375/345; 340/10.3, 825, 340/572.4
See application file for complete search history.

(56) References Cited

U.S. PATENT DOCUMENTS 4,811,421 A * 3/1989 Havel et al. ............... 455/67.11
(Continued)

FOREIGN PATENT DOCUMENTS

EP    1437844 A2    7/2004
(Continued)

OTHER PUBLICATIONS

International Search Report for Application No. PCT/KR2007/004690, dated Jan. 7, 2008.

*Primary Examiner* — Lana N Le
(74) *Attorney, Agent, or Firm* — Nelson Mullins Riley & Scarborough LLP; EuiHoon Lee, Esq.

(57) ABSTRACT

There is provided to an RF calibration apparatus and method for a multi-antenna mobile communication system, which calibrates a phase error and gain error of an RF path by calculating the minimum value of a sum of an initialized reference signal and a comparison signal by a simple operation and controlling the phase value of a phase converter and the gain of a variable amplifier on the RF path, in calibrating the RF path of a multi-antenna mobile communication system of a TDD (Time Division Duplexing) type or FDD (Frequency Division Duplexing) type.

13 Claims, 5 Drawing Sheets

U.S. PATENT DOCUMENTS

| | | | |
|---|---|---|---|
| 6,799,023 B2 * | 9/2004 | Pinola et al. | 455/234.1 |
| 7,515,884 B2 * | 4/2009 | Blech et al. | 455/115.1 |
| 2001/0020919 A1 | 9/2001 | Maruta | |
| 2005/0258940 A1 * | 11/2005 | Quan | 340/10.3 |
| 2008/0179948 A1 * | 7/2008 | Nagarkatti et al. | 455/127.1 |

FOREIGN PATENT DOCUMENTS

| | | |
|---|---|---|
| JP | 2001-285165 | 10/2001 |
| JP | 2006-5436 | 1/2006 |
| KR | 1020000035900 | 6/2000 |
| KR | 1020030007680 | 1/2003 |
| KR | 1020040031520 | 4/2004 |
| KR | 1020040063387 | 7/2004 |
| KR | 1020050066796 | 6/2005 |
| KR | 1020060066498 | 6/2006 |
| WO | WO-98/09372 A1 | 3/1998 |

* cited by examiner

RADIO FREQUENCY CALIBRATION APPARATUS AND METHOD FOR MULTI-ANTENNA MOBILE COMMUNICATION SYSTEM

RELATED APPLICATIONS

This application is a 35 U.S.C. §371 national stage filing of International Application No. PCT/KR2007/004690 filed on Sep. 21, 2007, which claims priority to, and the benefit of, Korean Patent Application No. 10-2006-0095877 filed on Sep. 29, 2006. The contents of the aforementioned applications are hereby incorporated by reference.

TECHNICAL FIELD

The present invention relates to a multi-antenna mobile communication system; and more particularly, and an RF (Radio Frequency) calibration apparatus and method for a multi-antenna mobile communication system, which calibrates a phase error and gain error of an RF path by calculating the minimum value of a sum of an initialized reference signal and a comparison signal by a simple operation and controlling the phase value of a phase converter and the gain of a variable amplifier on the RF path.

This work was partly supported by the Information Technology (IT) research and development program of the Korean Ministry of Information and Communication (MIC) and/or the Korean Institute for Information Technology Advancement (IITA) [2005-S-404-12, "Research & Development of Radio Transmission Technology for 3G evolution"] and the National Research Laboratory (NRL) program of the Korean Ministry of Science and Technology (MOST)/the Korea Science and Engineering Foundation (KOSEF) [2005-S-404-12, "Research & Development of Radio Transmission Technology for 3G evolution"].

BACKGROUND ART

A multi-antenna mobile communication system is a system that has the merit of sending a large amount of data at a high speed by an increase of the entire data throughput by configuring multiple antenna paths.

In order to maximize the performance of the multi-antenna mobile communication system, an error of the phase and gain properties of multiple RF paths should be efficiently calibrated.

Figure 1:
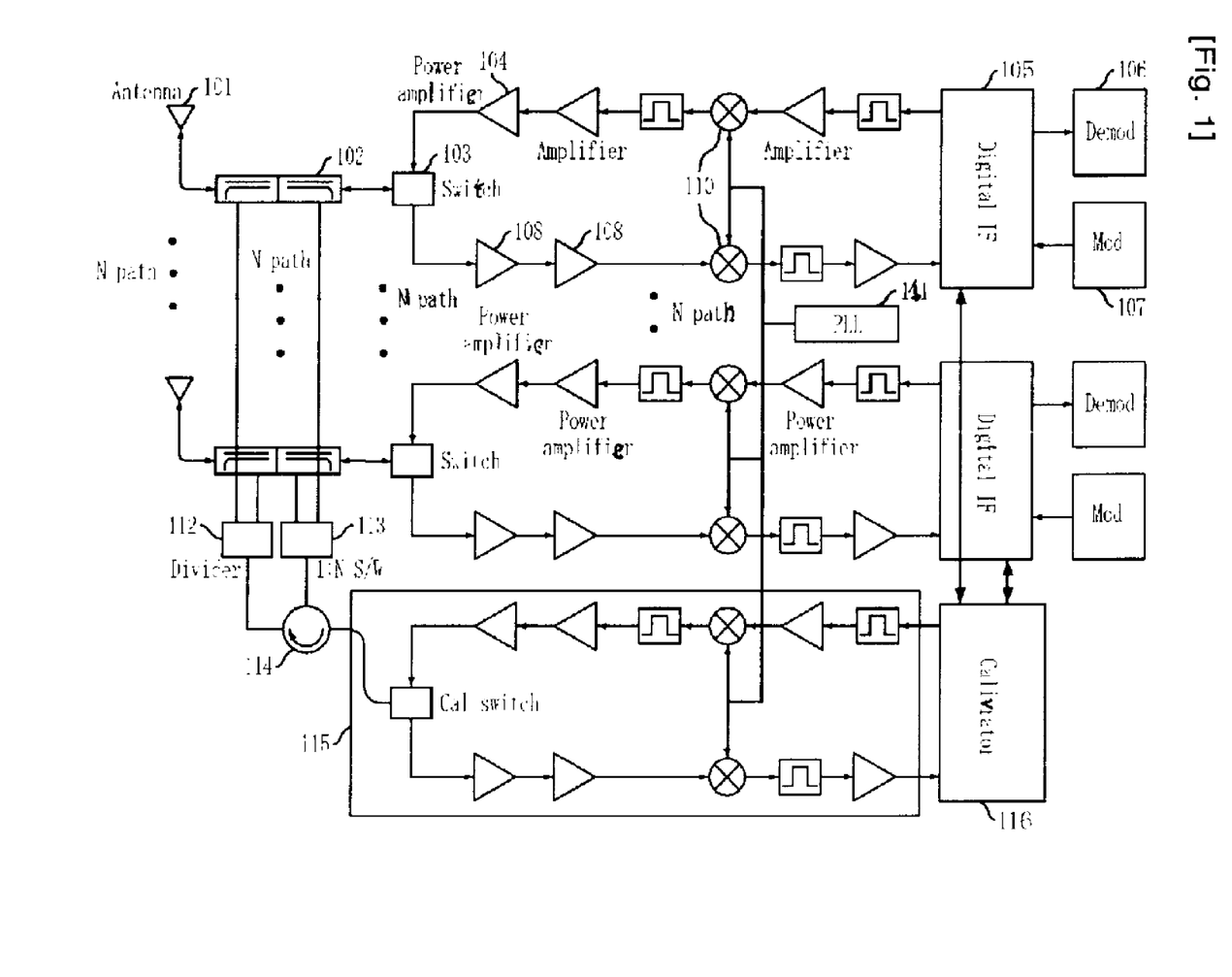
FIG. 1 is an explanatory view illustrating a conventional RF path calibration method for a multi-antenna mobile communication system.

FIG. 1 is an explanatory view illustrating a conventional RF path calibration method for a multi-antenna mobile communication system.

As shown in FIG. 1, the conventional RF path calibration of the multi-antenna mobile communication system is divided into transmission RF path calibration and reception RF path calibration.

First, in the transmission RF path calibration method, a transmission signal from a baseband modem unit or calibration unit is coupled at the front end of an antenna and down-converted, and then a change in the phase and amplitude of an RF transmission path is calculated by using the correlation between the down-converted transmission signal and the original transmission signal.

That is, when an IF transmission signal from a digital IF 105 or baseband modulator 107 is transmitted to an antenna 101 through an RF transmission path, a coupler 102 at the front end of the antenna 101 couples the RF transmission signal to deliver the same to an RF calibration up/down converter 115.

Then, the RF calibration up/down converter 115 converts (down-converts) the RF transmission signal back to an IF transmission signal so as to be processed in the baseband, and then applies the same to a calibrator 116 in the baseband.

The calibrator 116 detects any change in the phase and gain of the RF transmission path by an operation of cross correlation of the IF transmission signal inputted from the RF calibration up/down converter 115 and the IF transmission signal from the digital IF 105 or the baseband modulator 107.

A transmission RF path calibration is performed by the above procedure.

Next, in a reception RF path calibration method, a test vector or test signal from a baseband modem unit or calibration unit is up-converted by the RF calibration up/down converter 115, and then received through a reception RF path, wherein a change in the phase and amplitude of the RF reception path is calculated by using the correlation with the original test signal.

That is, the RF calibration up/down converter 115 converts a test signal from the calibrator 116 into an RF test signal, and then inputs the same to the RF reception path simultaneously through a switch 113, a circulator 114, and a divider 112.

The RF test signal so inputted is down-converted through an RF receiver, and then inputted to a baseband demodulator 106. At this time, the calibrator 116 detects any change in the phase and gain of the RF reception path by an operation of cross correlation of the test signal transmitted at the initial stage and the RF test signal passed through the RF reception path.

The error of the RF transmission and reception phase and gain thus detected is reflected in the procedure of generating a transmission signal by the modulator 107 and the demodulator 106, and upon reception, it is reflected in the procedure of demodulation.

The aforementioned conventional method has a problem in that the calculation amount of the baseband modulator and of the demodulator is remarkably increased because an error of the RF transmission and reception paths is calculated in the baseband, and the hardware complexity of the system is increased due to an increase of the interface among the modulator, the demodulator, and the calibrator.

In addition, the conventional method has a shortcoming that an additional RF up/down converter for up/down converting a transmission signal and a test signal is required because RF transmission and reception errors are calibrated in the baseband, and additional RF parts, such as the switch, the divider, the circulator, etc. are required at the front end of the RF antenna.

Further, the conventional method is problematic in that the flexibility of the baseband system is reduced because an error of the RF path is calibrated by using a special test signal in the baseband, and there is a limit in the establishment of a system having an excellent expandability.

DISCLOSURE OF INVENTION

Technical Problem

It is, therefore, an object of the present invention to provide an RF calibration apparatus and method for a multi-antenna mobile communication system. A transmission reference signal that has the same amplitude as an IF transmission signal but has a phase difference of 180 degrees is generated, and then the phase value of a phase converter and the gain of a variable amplifier on an RF transmission path are controlled so that the power value of the generated transmission reference signal and an IF transmission signal passed through the RF transmission path has the minimum value, and as calibration of the RF transmission path is finished, the above processes are carried out by using a leaked IF transmission signal passed through an RF reception path to control the phase value of a phase converter and the gain of a variable amplifier on the reception path so that the sum of the leaked IF transmission signal and the reception reference signal has the minimum value. Consequently, the phase error and gain error of the RF transmission and reception paths can be calibrated.

Technical Solution

In accordance with one aspect of the present invention, there is provided an RF (Radio Frequency) path calibration apparatus for a multi-antenna mobile communication system, the apparatus including: an RF transmission path calibrating means for generating a transmission reference signal, adding the generated transmission reference signal and a second IF transmission signal passed through an RF transmission path to measure an analog power value, converting the measured analog power value into a first digital value, and then controlling the phase value of a phase converter and the gain of a variable amplifier on the transmission path by using the first digital value so that the analog power value has the minimum value; and an RF reception path calibrating means for generating a reception reference signal, adding the generated reception reference signal and the first IF transmission signal to measure an analog power value, converting the measured analog power value into a second digital value, and then controlling the phase value of a phase converter and the gain of a variable amplifier on the reception path by using the second digital value so that the analog power value has the minimum value.

In accordance with another aspect of the present invention, there is provided an RF path calibration method for a multi-antenna mobile communication system, the method including the steps of: generating a transmission reference signal, adding the generated transmission reference signal and a second IF transmission signal passed through an RF transmission path to measure an analog power value, converting the measured analog power value into a first digital value, and controlling the phase value of a phase converter and the gain of a variable amplifier on the transmission path by using the first digital value so that the analog power value has the minimum value; and generating a reception reference signal, adding the generated reception reference signal and the first IF transmission signal to measure an analog power value, converting the measured analog power value into a second digital value, and controlling the phase value of a phase converter and the gain of a variable amplifier on the reception path by using the second digital value so that the analog power value has the minimum value.

Further, the present invention calibrates an error of a multi-antenna RF path through the RF self loop, rather than in the baseband.

Advantageous Effects

In accordance with the present invention, a transmission reference signal that has the same amplitude as an IF transmission signal but has a phase difference of 180 degrees is generated, and then the phase value of a phase converter and the gain of a variable amplifier on an RF transmission path are controlled so that the power value of the generated transmission reference signal and an IF transmission signal passed through the RF transmission path has the minimum value, and as calibration of the RF transmission path is finished, the above processes are carried out by using a leaked IF transmission signal passed through an RF reception path to control the phase value of a phase converter and the gain of a variable amplifier on the reception path so that the sum of the leaked IF transmission signal and the reception reference signal has the minimum value. Consequently, the phase error and gain error of the RF transmission and reception paths can be calibrated.

In addition, in the present invention, unlike the prior art, RF path calibration is not calculated in the baseband, but RF self calibration is enabled by using the "Out-phase" characteristic. Thus, it is possible to maintain an accurate path calibration without adding the calculation amount in the baseband and RF hardware therefor. Further, the present invention can be linked with any system, thereby increasing the flexibility of RF hardware.

Moreover, the present invention can calibrate the RF path without the RF calibration up and down converters by suggesting a reception path calibration using the transmission leakage amount of a TDD (Time Division Duplexing) system.

BEST MODE FOR CARRYING OUT THE INVENTION

The advantages, features and aspects of the invention will become apparent from the following description of the embodiments with reference to the accompanying drawings, which is set forth hereinafter. Thus, the present invention will be easily carried out by those skilled in the art. Further, in the following description, well-known arts will not be described in detail if it seems that they could obscure the invention in unnecessary detail. Hereinafter, preferred embodiments of the present invention will be set forth in detail with reference to the accompanying drawings.

Figure 2:
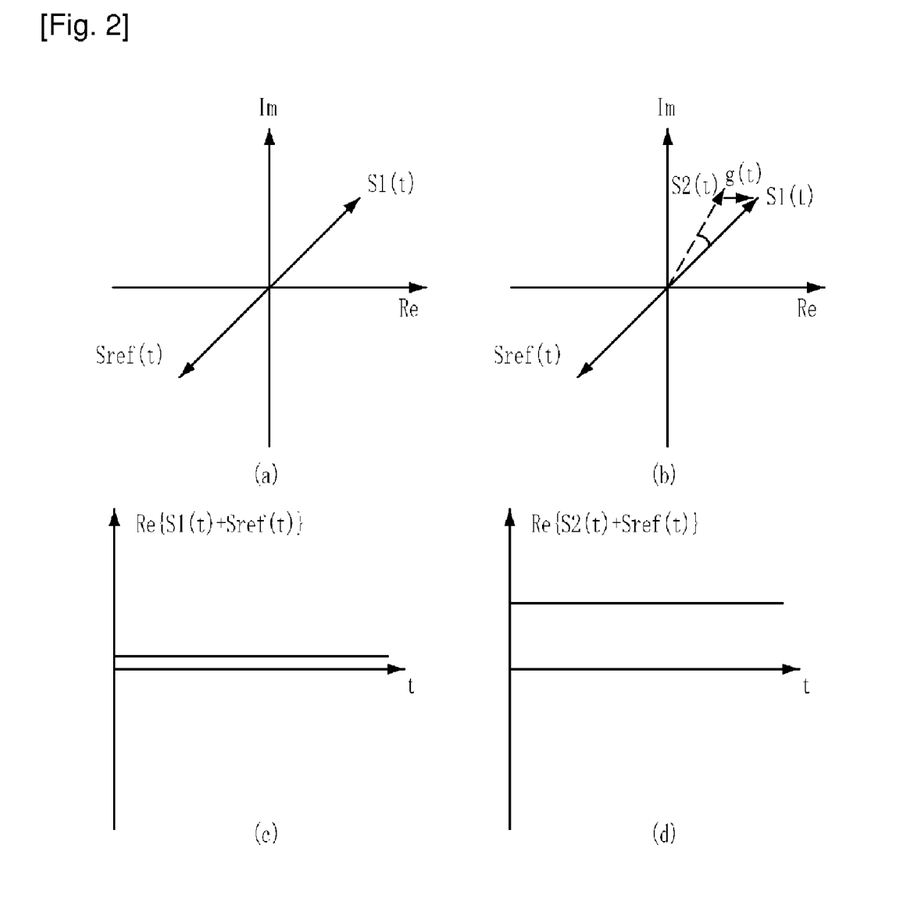
FIG. 2 is a view describing the principle of RF path calibration in accordance with the present invention.

FIG. 2 is a view describing the principle of RF path calibration in accordance with the present invention.

As shown in (a) of FIG. 2, a reference signal Sref(t) is set so that it has the same as a given signal S1($t$) in amplitude but a difference of 180 degrees in phase. Thus, when the given signal S1($t$) and the reference signal Sref(t) are added, the amplitude (gain) is "0" as shown in (c) of FIG. 2.

Thereafter, when it is assumed that S1($t$) passed through the RF path has changed by θ(t) in phase and g(t) in amplitude as shown in (b) of FIG. 2, the sum of S1($t$) and Sref(t) has a predetermined amplitude as shown in (d) of FIG. 2, rather than "0".

To calibrate this, the phase of S2($t$) is controlled in the "+" direction (clockwise direction) and the "−" direction (counterclockwise direction) so that the sum (vector sum) of S2(t) and Sref(t) is minimized. That is, it is controlled so that θ(t) is the minimum.

Even if θ(t) is calibrated, because the amplitude (gain) is not the same, the amplitude of the sum of S2(t) and Sref(t) has a predetermined value, rather than "0".

Therefore, the amplitude (gain) is controlled to the "+" direction (increase) and the "−" direction (decrease) so that the sum (vector sum) of S2(t) and Sref(t) is minimized. That is, it is controlled so that g(t) gets minimized.

RF path calibration is achieved completely by the above procedure.

Figure 3:
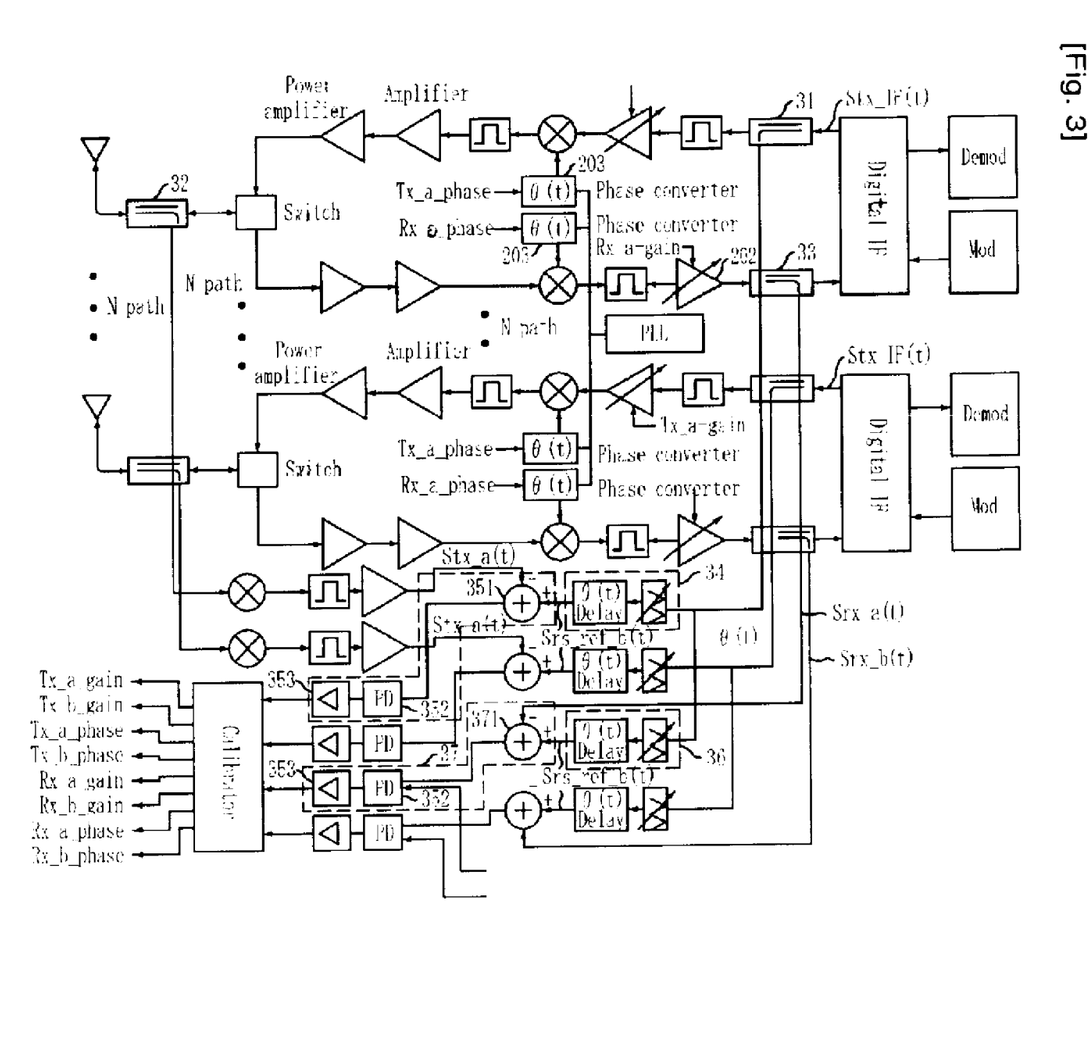
FIG. 3 is a block diagram illustrating an RF path calibration apparatus for a multi-antenna mobile communication system in accordance with one embodiment of the present invention.

FIG. 3 is a circuit diagram illustrating an RF path calibration apparatus for a multi-antenna mobile communication system in accordance with one embodiment of the present invention.

As shown in FIG. 3, the RF path calibration apparatus for a multi-antenna mobile communication system in accordance with the present invention includes a first coupler 31 for branching an IF transmission signal Stx_IF(t) from a digital IF or D/AC (Digital/Analog Converter), a second coupler 32 for branching the IF transmission signal passed through an RF transmission path at the front end of the antenna, a third coupler 33 for branching the IF transmission signal leaked to an RF reception path due to the degree of isolation of a switch when transmitting the IF transmission signal to the antenna through the switch, a transmission reference signal generator 34 for generating a transmission reference signal that has the same amplitude as the IF transmission signal branched through the first coupler 31 but has a phase difference of 180 degrees, a first signal processor 35 for adding the transmission reference signal generated from the transmission reference signal generator 34 and the IF transmission signal branched by the second coupler 32, measuring an analog power value, and then converting the same into a digital value, a reception reference signal generator 36 for generating a reception reference signal that has the same amplitude as the IF transmission signal branched through the third coupler 33 but has a phase difference of 180 degrees, a second signal processor 37 for adding the reception reference signal generated from the reception reference signal generator 36 and the IF transmission signal branched by the first coupler 31, measuring an analog power value, and then converting the same into a digital value, and a controller 38 for controlling the phase value of a phase converter 202 on transmission and reception paths and the gain of a variable amplifier 203 by using the digital values from the first signal processor 35 and the second signal processor 37 so that the IF transmission signal is similar to the reference signal.

Here, the controller 38 controls the phase value of the phase converter and the gain of the variable amplifier so that the IF transmission signal branched by the second coupler 32 is similar to the transmission reference signal and the IF transmission signal branched by the third coupler 33 is similar to the reception reference signal, that is, the sum (vector sum) of the IF transmission signal branched by the second coupler 32 and the transmission reference signal is minimized, and the sum of the IF transmission signal branched by the third coupler 33 and the reception reference signal is minimized.

Further, each of the transmission reference signal generator 34 and the reception reference signal generator 36 includes a variable attenuator 341 for controlling the gain so that the transmission and reception reference signals have the same amplitude as the corresponding IF transmission signal, and a phase converter 342 for controlling the transmission and reception reference signals to have a phase difference of 180 degrees between the reference signals and the corresponding IF transmission signal. Here, the phase converter 342 makes temporal synchronization accurate by using a delay buffer for accurate comparison with the signal down-converted through the RF transmission and reception paths.

The first signal processor 35 includes a first adder 351 for adding the transmission reference signal generated from the transmission reference signal generator 34 and the IF transmission signal branched by the second coupler 32, a first power measuring device 352 for measuring the power value of the signal added in the first adder 351, and a first A/D (Analog/Digital) converter 353 for converting the analog power value measured in the first power measuring device 352 into a digital value.

The second signal processor 37 includes a second adder 371 for adding the reception reference signal generated from the reception reference signal generator 36 and the IF transmission signal branched by the first coupler 31, a second power measuring device 372 for measuring the power value of the signal added in the second adder 371, and a second A/D converter 373 for converting the analog power value measured in the second power measuring device 372 into a digital value.

It should be noted that although the present invention is provided with a plurality of transmission and reception reference signal generators and first and second signal processors corresponding to the number of antennas, only one transmission reference signal generator and one reception reference signal generator and the first and second signal processors were described to help understand the present invention.

Also, it is preferably that for calibration of the transmission and reception paths, an N-number of transmission paths and an N-number of reception paths are simultaneously calibrated depending on the number of paths of the multi-antenna system.

Figure 4:
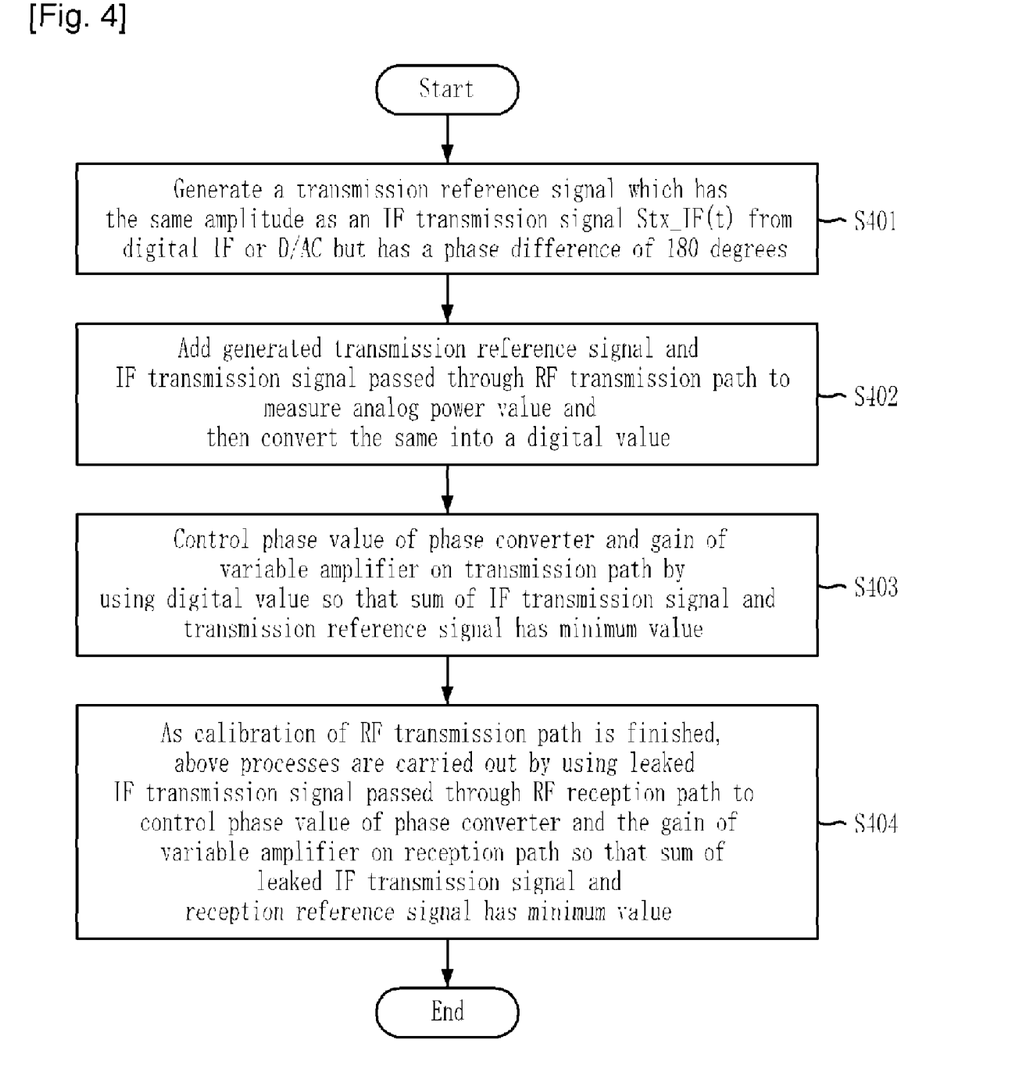
FIG. 4 is a flowchart illustrating an RF path calibration method for a multi-antenna mobile communication system in accordance with another embodiment of the present invention.

FIG. 4 is a flowchart describing an RF path calibration method for a multi-antenna mobile communication system in accordance with another embodiment of the present invention.

First, a transmission reference signal is generated which has the same amplitude as an IF transmission signal Stx_IF(t) from a digital IF or D/AC but has a phase difference of 180 degrees in step S401.

Thereafter, in step S402, the transmission reference signal so generated and the IF transmission signal passed through an RF transmission path are added to measure an analog power value is measured and then convert the same into a digital value.

In a following step S403, the phase value of a phase converter and the gain of a variable amplifier on the transmission path are controlled by using the digital value so that the sum of the IF transmission signal and the transmission reference signal has the minimum value.

Next, in step S404, as the calibration of the RF transmission path is finished, the above processes are carried out by using a leaked IF transmission signal passed through the RF reception path to control the phase value of a phase converter and the gain of a variable amplifier on the reception path so that the sum of the leaked IF transmission signal and the reception reference signal has the minimum value.

Here, the leaked IF transmission signal refers to the signal which is leaked due to the degree of isolation of a switch and flows into the RF reception path when the transmission signal Stx_IF(t) is transmitted to the antenna through the switch via the RF transmission path.

In one example, a TDD switch used in a TDD RF base station system has a limited amount of clearance of about 60 dB, for example, an output RF system of 40 dBm has a leaked RF power value of about −20 dBm.

Meanwhile, RF reception path calibration is carried out after the RF transmission calibration is finished, and in case of the TDD system, the RF receiver receives a leaked transmission signal and an actual RF reception signal separately in terms of time. Thus, the temporal operation timing of a power detector should be defined to form an accurate loop.

Figure 5:
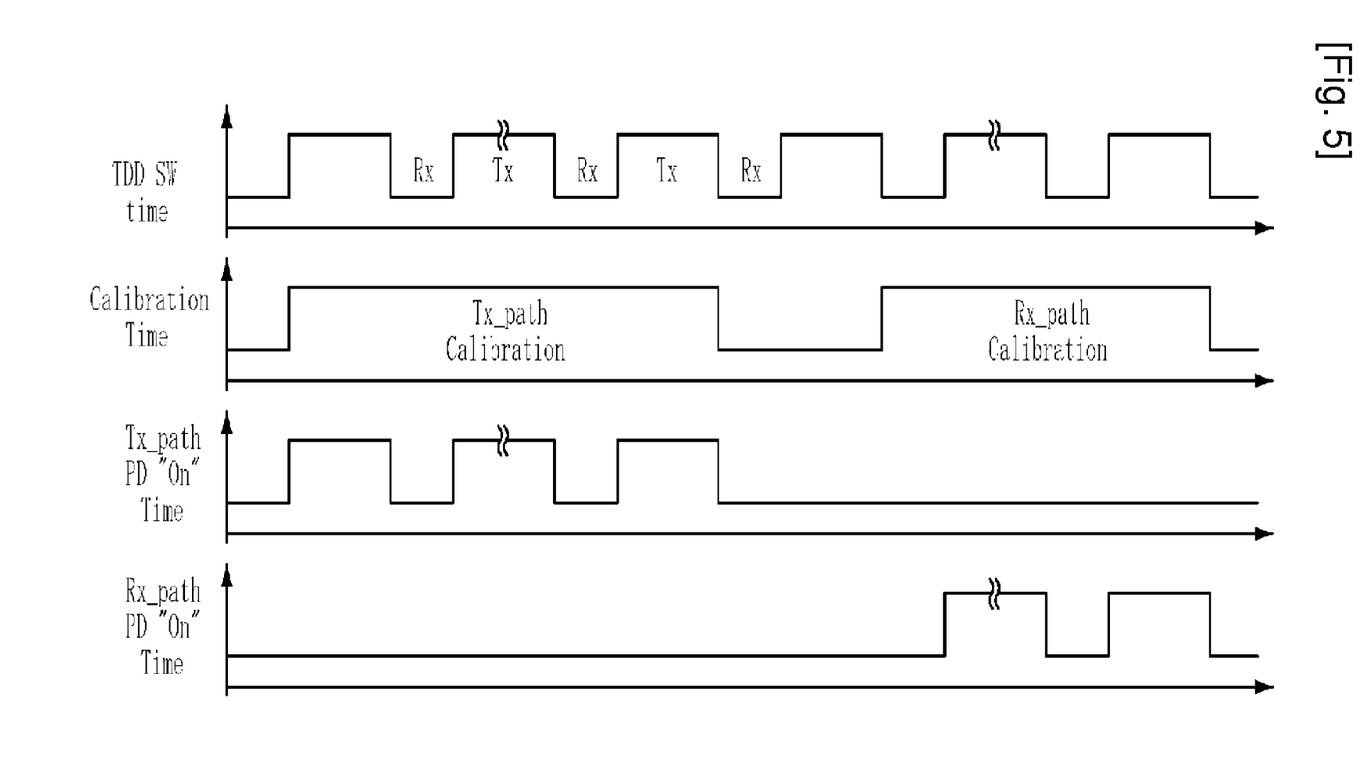
FIG. 5 is a timing chart describing an RF path calibration algorithm of the multi-antenna mobile communication system in accordance with the present invention.

FIG. 5 is a timing chart describing an RF path calibration algorithm for a multi-antenna mobile communication system in accordance with the present invention, and particularly shows the RF transmission and reception timings and calibration timing of the TDD system and the timing of transmission and reception power detectors.

First, a "TDD SW time" timing chart is a transmission and reception timing chart of an RF TDD system where a transmission signal is outputted in a Tx section and a terminal reception signal is inputted from an antenna in an Rx section.

Next, a calibration timing chart is an overall timing chart of a calibration loop, in which an RF transmission path calibration is performed first, and then an RF reception path calibration is conducted by using the calibrated leakage signal.

Meanwhile, upon calibration, a power detector reads an electrical energy only in a Tx section upon RF transmission calibration. Since there is no signal in an Rx section, the power detector is turned OFF for accurate detection, and the previous value should be maintained.

Likewise, upon RF reception calibration, since a leakage signal of a signal generated in a Tx section is also used, the power detector operates in the Rx section of "Rx_path_calibration" section.

The method of the present invention as mentioned above may be implemented by a software program that is stored in a computer-readable storage medium such as CD-ROM, RAM, ROM, floppy disk, hard disk, optical magnetic disk, or the like. This procedure may be readily carried out by those skilled in the art; and therefore, details of thereof are omitted here.

While the present invention has been described with respect to the particular embodiments, it will be apparent to those skilled in the art that various changes and modifications may be made without departing from the spirit and scope of the invention as defined in the following claims.

The invention claimed is:

1. An RF (Radio Frequency) path calibration apparatus for a multi-antenna mobile communication system, the apparatus comprising:
   an RF transmission path calibrating means for generating a transmission reference signal, adding the generated transmission reference signal and a second IF transmission signal passed through an RF transmission path to measure an analog power value, converting the measured analog power value into a first digital value, and then controlling the phase value of a phase converter and the gain of a variable amplifier on the transmission path by using the first digital value so that the analog power value has the minimum value; and
   an RF reception path calibrating means for generating a reception reference signal, adding the generated reception reference signal and the first IF transmission signal to measure an analog power value, converting the measured analog power value into a second digital value, and then controlling the phase value of a phase converter and the gain of a variable amplifier on the reception path by using the second digital value so that the analog power value has the minimum value.

2. The apparatus of claim 1, wherein the transmission reference signal has the same amplitude as a first IF transmission signal but has a phase difference of 180 degrees, and the reception reference signal has the same amplitude as a third IF transmission signal leaked to an RF reception path but has a phase difference of 180 degrees.

3. The apparatus of claim 1, wherein the RF transmission and reception path calibrating means control the phase value of the phase converter and the gain of the variable amplifier so that the sum or vector sum of the transmission reference signal and the second IF transmission signal passed through the RF transmission path is minimized and the sum of the reception reference signal and the first IF transmission signal is minimized.

4. The apparatus of claim 1, wherein the apparatus includes components of the number corresponding to the number of antennas, and
   wherein the corresponding transmission or reception path is calibrated by using a digital value from each signal processing unit.

5. The apparatus of claim 1, wherein the RF transmission path calibrating means includes:
   a first branching means for branching an IF transmission signal from a digital IF;
   a second branching means for branching an IF transmission signal passed through an RF transmission path;
   a transmission reference signal generating means for generating a transmission reference signal that has the same amplitude as the IF transmission signal branched through the first branching means but has a phase difference of 180 degrees;
   a first signal processing means for adding the transmission reference signal generated from the transmission reference signal generating means and the IF transmission signal branched by the second branching means, measuring an analog power value, and then converting the same into a digital value; and
   a first controller for controlling the phase value of the phase converter and the gain of the variable amplifier on the transmission path by using the digital value from the first signal processing means so that the measured power value has the minimum value.

6. The apparatus of claim 5, wherein the transmission reference signal generating means includes:
   a variable attenuator for controlling the gain so that the transmission reference signal has the same amplitude as the corresponding IF transmission signal, and a phase converter for controlling the transmission reference signal to have a phase difference of 180 degrees with the corresponding IF transmission signal, wherein the phase converter is provided with a delay buffer for temporal synchronization, for accurate comparison with the signal down-converted through the RF transmission path.

7. The apparatus of claim 5, wherein the first signal processing means includes:
   a first adder for adding the transmission reference signal generated from the transmission reference signal generator and the IF transmission signal branched by the second branching means;
   a first power measuring device for measuring the power value of the signal added in the first adder; and
   a first A/D converter for converting the analog power value measured in the first power measuring device into a digital value.

8. The apparatus of claim 1, wherein the RF reception path calibrating means includes:

a first branching means for branching an IF transmission signal from a digital IF;

a third branching means for branching an IF transmission signal leaked to an RF reception path;

a reception reference signal generating means for generating a reception reference signal that has the same amplitude as the IF transmission signal branched through the fourth branching means but has a phase difference of 180 degrees;

a second signal processing means for adding the reception reference signal generated from the reception reference signal generating means and the IF transmission signal branched by the third branching means, measuring an analog power value, and then converting the same into a digital value; and a second controller for controlling the phase value of the phase converter and the gain of the variable amplifier on the reception path by using the digital value from the second signal processing means so that the measured power value has the minimum value.

9. The apparatus of claim 8, wherein the reception reference signal generating means includes:

a variable attenuator for controlling the gain so that the reception reference signal has the same amplitude as the corresponding IF transmission signal; and a phase converter for controlling the reception reference signal to have a phase difference of 180 degrees with the corresponding IF transmission signal, wherein the phase converter is provided with a delay buffer for temporal synchronization, for accurate comparison with the signal down-converted through the RF reception path.

10. The apparatus of claim 8, wherein the second signal processing means includes:

a second adder for adding the reception reference signal generated from the reception reference signal generator and the IF transmission signal branched by the third branching means;

a second power measuring device for measuring the power value of the signal added in the second adder; and a second A/D converter for converting the analog power value measured in the second power measuring device into a digital value.

11. An RF path calibration method for a multi-antenna mobile communication system, the method comprising the steps of:

generating a transmission reference signal that has the same amplitude as a first IF transmission signal but has a phase difference of 180 degrees, adding the generated transmission reference signal and a second IF transmission signal passed through an RF transmission path to measure an analog power value, converting the measured analog power value into a first digital value, and controlling the phase value of a phase converter and the gain of a variable amplifier on the transmission path by using the first digital value so that the analog power value has the minimum value; and generating a reception reference signal that has the same amplitude as a third IF transmission signal leaked to an RF reception path but has a phase difference of 180 degrees, adding the generated reception reference signal and the first IF transmission signal to measure an analog power value, converting the measured analog power value into a second digital value, and controlling the phase value of a phase converter and the gain of a variable amplifier on the reception path by using the second digital value so that the analog power value has the minimum value.

12. The method of claim 11, wherein the transmission reference signal generating step includes the steps of:

firstly-branching an IF transmission signal from a digital IF;

secondary-branching the IF transmission signal passed through an RF transmission path;

generating a transmission reference signal that has the same amplitude as the IF transmission signal branched through the first branching step but has a phase difference of 180 degrees;

adding the generated transmission reference signal and the IF transmission signal branched by the second branching step, measuring an analog power value, and then converting the same into a first digital value; and controlling the phase value of the phase converter and the gain of the variable amplifier on the transmission path by using the first digital value so that the measured power value has the minimum value.

13. The method of claim 11, wherein the second branching step includes the steps of: firstly-branching an IF transmission signal from a digital IF;

thirdly-branching the IF transmission signal leaked to an RF reception path;

generating a reception reference signal that has the same amplitude as the IF transmission signal branched through the third branching step but has a phase difference of 180 degrees;

adding the generated reception reference signal and the IF transmission signal branched by the first branching step, measuring an analog power value, and then converting the same into a second digital value; and controlling the phase value of the phase converter and the gain of the variable amplifier on the reception path by using the second digital value so that the measured power value has the minimum value.

* * * * *